(12) United States Patent
Leidy et al.

(10) Patent No.: US 6,702,097 B1
(45) Date of Patent: Mar. 9, 2004

(54) METHOD OF AND APPARATUS FOR TRANSFERRING ARTICLES FROM A FIXED POSITION TO A MOVING CONVEYOR

(75) Inventors: D. Wayne Leidy, Perrysburg, OH (US); Frank J. DiFrank, Toledo, OH (US)

(73) Assignee: Owens-Brockway Glass Container Inc., Toledo, OH (US)

(*) Notice: Subject to any disclaimer, the term of this patent is extended or adjusted under 35 U.S.C. 154(b) by 0 days.

(21) Appl. No.: 10/235,189

(22) Filed: Sep. 4, 2002

(51) Int. Cl.[7] .......................... B65G 25/00; C03B 11/00
(52) U.S. Cl. ...................... 198/468.01; 65/239; 65/260
(58) Field of Search .............................. 198/418.6, 426, 198/431, 432, 433, 468.01, 370.02, 370.07, 723, 740; 414/744.2, 198; 65/260, 239, 241

(56) References Cited

U.S. PATENT DOCUMENTS

| | | | |
|---|---|---|---|
| 3,559,537 A | * 2/1971 | Faure | ........................... 91/462 |
| 3,595,365 A | * 7/1971 | Faure | ..................... 198/468.01 |
| 3,795,503 A | 3/1974 | Perry | |
| 4,162,911 A | 7/1979 | Mallory | |
| 4,199,344 A | 4/1980 | Mumford et al. | |
| 4,222,480 A | 9/1980 | Perry | |
| 4,340,413 A | * 7/1982 | Rowland | ....................... 65/375 |
| 4,427,431 A | * 1/1984 | Mumford et al. | .............. 65/163 |
| 4,462,519 A | * 7/1984 | Parkell et al. | .......... 198/468.01 |
| 4,466,532 A | * 8/1984 | Minneman et al. | ..... 198/468.01 |
| 5,125,499 A | 6/1992 | Saathoff et al. | |
| 5,160,015 A | 11/1992 | Perry et al. | |
| 5,429,651 A | 7/1995 | Bolin | |
| 5,575,828 A | * 11/1996 | Dutto et al. | .................... 65/158 |
| 5,904,745 A | 5/1999 | Nafziger et al. | |
| 6,494,063 B1 | * 12/2002 | Malek | ........................... 65/260 |

* cited by examiner

Primary Examiner—Richard Ridley (57) ABSTRACT

Sweepout apparatus (10) for sweeping an aligned array of glass containers (C) from a deadplate (12) of a I.S. glass container forming machine to a conveyor (14) that runs transversely to the array of containers on the deadplate and serves to transfer the containers for further processing. The apparatus comprises a swivel portion (16 or 116) that is oscillatable in an arc of approximately 90° and a head (18) that is carried by the swivel portion and is reciprocable relative thereto, the head carrying an elongated bar (20) with a spaced plurality of pocket-defining fingers (22) that extend from the bar. The sweepout further comprises independently operatable first and second coaxial reversible electrical motors (30, 28), an output shaft (32) of the second electric motor (28) passing through an annular output shaft (56) of the first electric motor (30). Reversible motion imparted to the annular output shaft of the first electric motor causes oscillating motion of the swivel portion of the sweepout apparatus. Reversible motion imparted to the output shaft of the second electric motor axial through a planetary gear (42) imparts reciprocating motion to the elongated bar relative to other structure of the sweepout portion. The output shafts (32, 56) are rotatable independently of one another.

9 Claims, 10 Drawing Sheets

METHOD OF AND APPARATUS FOR TRANSFERRING ARTICLES FROM A FIXED POSITION TO A MOVING CONVEYOR

FIELD OF THE INVENTION

This invention relates to a method of, and an apparatus for, transferring a multiplicity of aligned articles on a stationary member to the flight of a conveyor that is moving transversely of the alignment of the articles on the stationary member. More particularly, this invention relates to a sweepout for transferring a multiplicity of aligned, freshly-formed glass containers on a deadplate of a glass container forming machine of the I.S. (individual section) type to the upper flight of a conveyor for transferring the glass containers to an annealing lehr.

BACKGROUND OF THE INVENTION

As is explained in commonly-assigned U.S. Pat. No. 6,076,654 (Leidy), the disclosure of which is incorporated by reference herein, various devices and steps are involved in transferring freshly-formed glass containers from the deadplates of an I.S. machine to an annealing lehr for heat treatment of the containers. Among the devices employed in such a process is a sweepout device that is used to simultaneously transfer a plurality of aligned containers, usually two, three or four containers, from an I.S. machine deadplate to an upper moving flight of an endless machine conveyor.

Prior art I.S. machine sweepout devices are described, for example, in commonly-assigned U.S. Pat. No. 3,795,503 (Perry), U.S. Pat. No. 4,162,911 (Mallory), U.S. Pat. No. 4,199,344 (Mumford et al.), U.S. Pat. No. 4,222,480 (Perry), and U.S. Pat. No. 5,904,745 (Nafziger et al.), the disclosure of each of which is also incorporated by reference herein. As is disclosed in such references, or as is otherwise known, a typical I.S. machine sweepout head has a horizontally extending elongated bar with a plurality of spaced, horizontally extending fingers extending transversely from the elongated bar. Each finger defines, with the elongated bar, a generally L-shaped container receiving pocket.

Prime movers, heretofore usually pneumatic cylinders, provide dual motions to the head with the elongated bar and fingers that extend therefrom. The first of such motions is a reciprocating motion a first portion of which serves to move the elongated bar and its fingers from a position out of contact with containers on the deadplate into a position engaging the containers on the deadplate. The other motion is a 90° oscillating motion to the head, a first portion of which transfers the containers on the deadplate to the upper flight of the machine conveyor. Then, as a second portion of the reciprocating motion, the elongated bar and its fingers are retracted to a position out of engagement with containers on the machine conveyor to permit the containers to be conveyed away from the forming machine by the machine conveyor, and, as a second portion of the 90° oscillating motion, the head with the elongated bar with its fingers is returned to its original position to be ready to begin a repeat of the process. While pneumatic cylinders have heretofore usually been used to power both required motions of a glass container sweepout head, U.S. Pat. No. 5,429,651 (Bolin), which specifically discloses a pneumatic device for actuating the reciprocating motion of the sweepout pusher mechanism, does disclose, in words only, at column 13, lines 45–50, that a stepping motor could also be used for such purpose. Further, U.S. Pat. No. 5,125,499 (Saathoff et al.) does teach the use of a stepping motor for powering the oscillating motion of a sweepout head, but also teaches the use of a fluid motor for powering the reciprocation of the pusher arm.

The use of a pneumatic cylinder to power either the reciprocation or the oscillation of a sweepout head finger-carrying bar has certain operating disadvantages, however. Precise control over the timing of the reciprocation or oscillation of the pusher head is difficult to achieve, which creates problems in accurately timing the motion of the pusher head relative to other motions of an I.S. machine. Further, modification of either of the timing of the sweepout pneumatic cylinders is difficult to achieve, as is required, for example, when the machine is modified to produce larger or smaller containers, and it is difficult to control the speeds of a pneumatically-powered sweepout head at the beginning and end of its extension and retraction motions.

SUMMARY OF THE INVENTION

To overcome the aforesaid and other problems associated with prior art I.S. machine sweepouts, according to the present invention there is provided an all-electric sweepout. The sweepout of the present invention has a pair of vertically arranged, reversible electrical motors, each motor preferably an a.c. servo motor. The motors are coaxially aligned, and the output shaft of the lower motor, which provides reciprocating motion to the sweepout head through a planetary gear drive, extends through an annular output shaft of the upper motor, which imparts oscillating motion to the sweepout head. The output shafts of the lower and upper motors are rotatable with respect to one another. Because the installed positions of the upper and lower motors are fixed, the wiring for the motors need not have a pigtail to accommodate movement of a motor relative to a source of power, and oil lines for motor cooling, which is desired to permit prolonged operation in a hostile, high-temperature environment, need not have flexible components. Also positioning the motors below the sweepout head does somewhat reduce the temperatures to which the motors are exposed.

Accordingly, it is an object of the present invention to provide a method of and an apparatus for transferring a plurality of articles from fixed positions to a moving conveyor in which all required motions are powered by reversible electric motors whose positions are fixed. More particularly, it is an object of the present invention to provide a method and an apparatus of the foregoing character that is well-suited for operating in proximity to a glass container forming machine, where the operating temperatures can be somewhat higher than ambient.

For a further understanding of the present invention and the objects thereof, attention is directed to the drawing and the following brief description thereof, to the detailed description of the invention and to the appended claims.

DETAILED DESCRIPTION OF THE INVENTION

Sweepout apparatus according to the present invention is indicated generally by the reference numeral 10 in FIGS. 1A, 1B, 1C and 2 of drawing. The sweepout apparatus 10 is used to simultaneously transfer an aligned plurality of freshly-formed glass containers C on a deadplate 12 of an I.S. machine to a moving upper flight of a takeout, (machine) conveyor 14. The containers C are then conveyed by the conveyor to an annealing lehr (not shown) for heat treatment of the containers C to relieve residual stresses therein, as is known in the art. The conveyor 14 extends transversely of the deadplate 12, and the transfer of the containers C from a deadplate 12 to the conveyor 14 requires that the containers C be transferred to the conveyor 14 and turned by 90° as they are transferred, to ensure that the containers C will be aligned with one another on the conveyor 14 as they were on the deadplate 12. To this end, the sweepout apparatus 10 is provided with a swivel portion 16 that is repeatedly oscillated through a 90° arc, including the motion from its FIG. 1A position to its FIG. 1C position. Further, the swivel portion 16 is provided with a sweepout head 18 that is repeatedly reciprocated, and the path of reciprocation of the sweepout head 18 includes movement from the position in FIG. 1A to the position in FIGS. 1B and 1C and then back to the position of FIG. 1A.

Figure 1A:
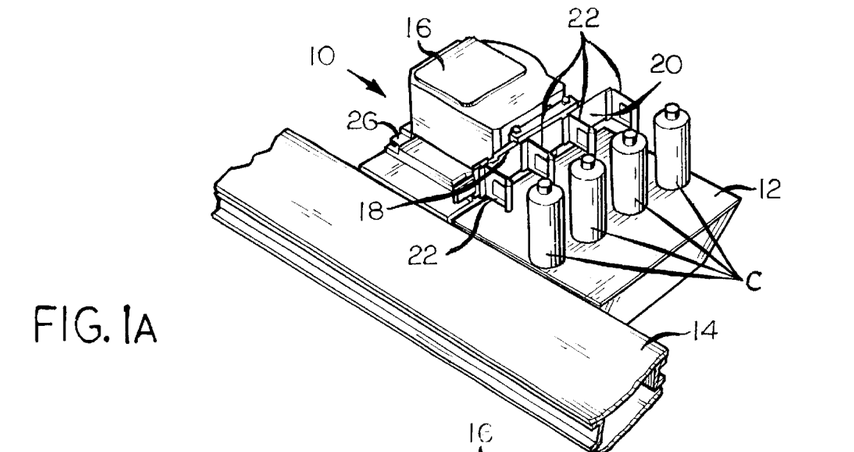
FIGS. 1A, 1B, and 1C are fragmentary, perspective views of apparatus according to the present invention, each view illustrating the apparatus at a different position in a cycle of operation.
Figure 1B:
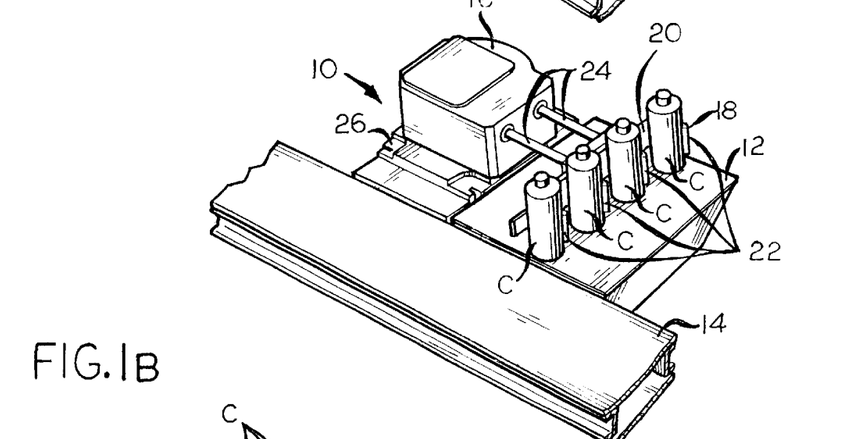
Figure 1C:
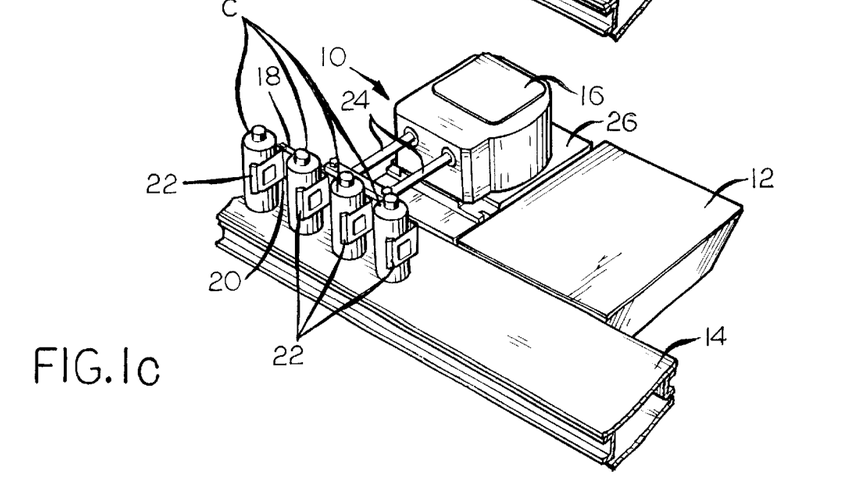
Figure 2:
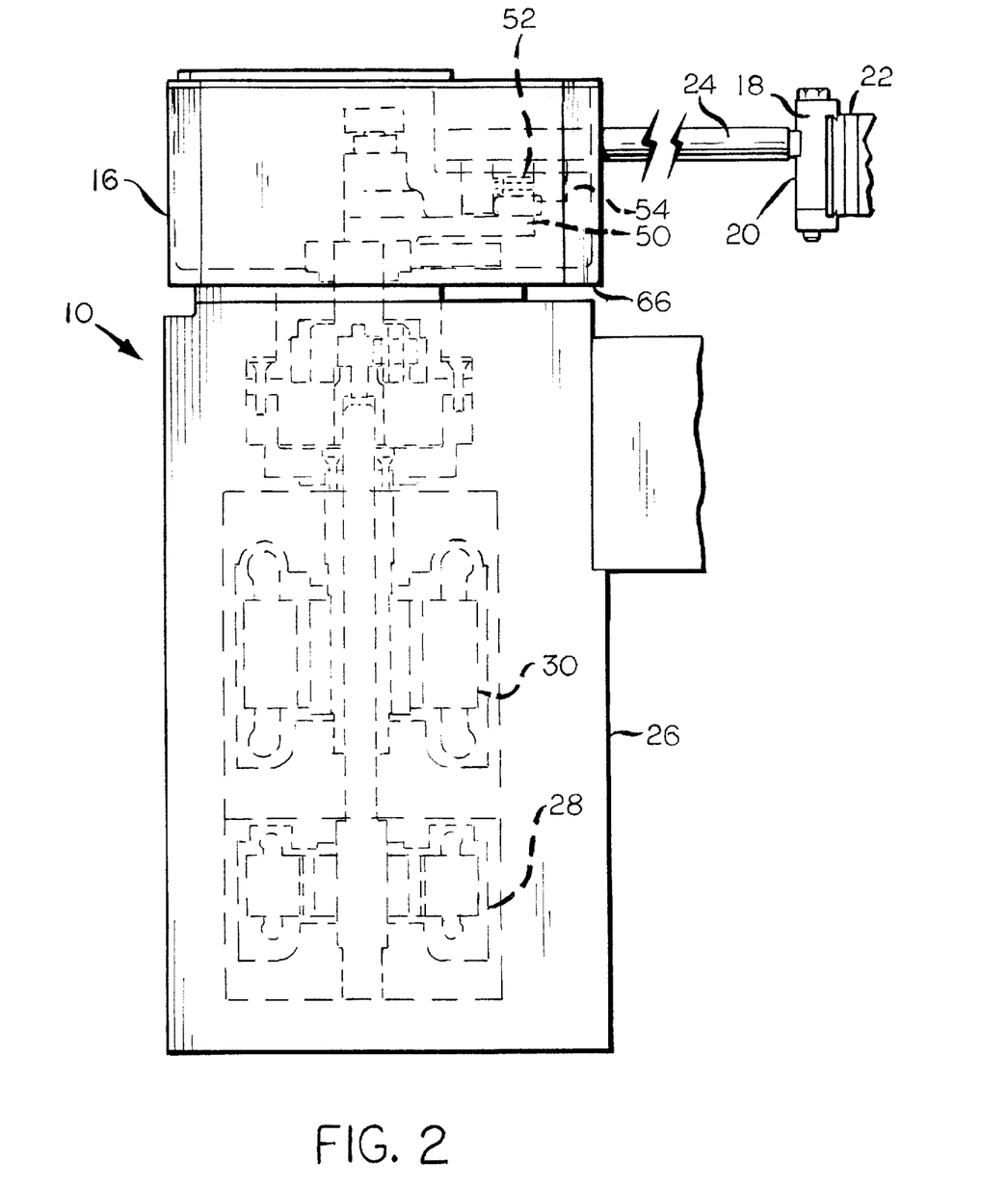
FIG. 2 is an elevation view, at an enlarged scale, of elements of the apparatus of FIGS. 1A, 1B, and 1C.

The sweepout head 18 includes an elongated, horizontally extending bar 20 with a plurality of spaced fingers 22 extending transversely from the bar 20. Each of the fingers 22 defines, with the bar 20, a pocket for receiving a container C, the number of fingers 22 extending from the bar 20 being the same as the number of containers C on the deadplate 12. The elongated bar 20 is mounted on spaced, horizontally extending rods 24 that are reciprocatable with respect to the swivel portion 16, as will be hereinafter described more fully, to reciprocate the bar 20 of the sweepout head 18 from the position of FIG. 1A, where the containers C are not engaged in pockets of the sweepout head 18, to the position of FIGS. 1B and 1C, where the containers C are engaged in the pockets of the sweepout head 18. After the transfer of the containers C from the FIG. 1A position to the FIG. 1C position, the sweepout head 18 is retracted to permit the containers C to be conveyed away by the conveyor 14, and the swivel portion 16 of the sweepout apparatus 10 is then turned, in reverse, from its FIG. 1C position to its FIG. 1A position to begin a repeat of the sweepout cycle with a fresh array of containers C on the deadplate 12. As shown in FIGS. 1A, 1B, and 1C, the sweepout head 18 is provided with four container-receiving pockets, and this is the construction that is suited for an I.S. machine that simultaneously produces four containers at each I.S. machine section, a type of machine that is often described as a "quad" machine. Of course, it is also known that an I.S. machine can also be adapted to simultaneously produce three containers at each I.S. machine section, a "triple gob" machine, or even two containers at each I.S. machine section, a "double gob" machine; in such cases, a sweepout apparatus 10 for a triple gob machine would have a sweepout head 18 with only three container-receiving pockets, and a sweepout apparatus 10 for a double gob machine would have a sweepout head with only two container-receiving pockets.

The sweepout apparatus 10 includes a stationary housing 26 that is positioned below and in alignment with the swivel portion 16. First and second reversible a.c. motors 28, 30, each preferably a servo motor for precise controllability, are positioned in vertical, coaxial alignment with each other within the housing 26. The motor 28, which is positioned beneath the motor 30, drives an output shaft 32, FIG. 4, which is rotatably supported in spaced bearings 34, 36. The output shaft 32 has a stub shaft 38 (FIG. 3) of a speed reduction planetary gear set 42 shrunk or otherwise inserted thereon, and the stub shaft 38, which is rotatably supported in a bearing 39, drives a sun gear 40 of the speed reduction planetary gear set 42. The planetary gear set 42 also has a spaced plurality of planetary gears 44, and the planetary gears 44, which are driven by the sun gear 40, engage an interior gear surface of a ring gear 46. The ring gear 46 is secured to the interior of a cup-shaped portion 48a of a shaft extension 48 that extends into the swivel portion 16 of the sweepout apparatus 10 and is rotatably supported in bearings 47, 49 for rotation relative to the swivel portion 16. The planetary gear set 42 serves to substantially reduce the rotational speed of the shaft extension 48 relative to that of the shaft 32, for example, by a 1:5 factor. Such a planetary gear set is available as a commercial item from Mectrol, Inc.

Figure 5:
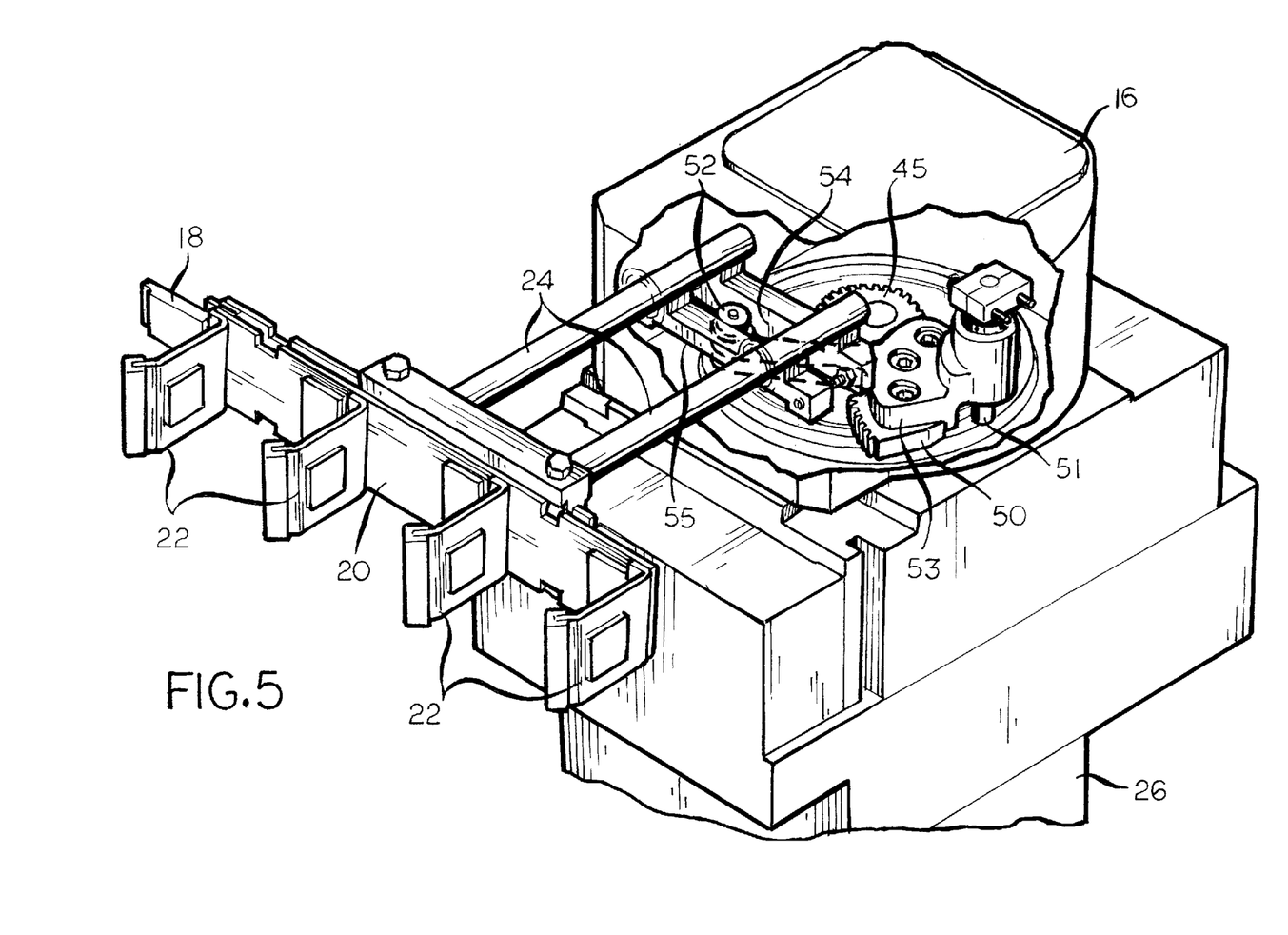
FIG. 5 is a fragmentary perspective view, with a portion of the structure broken away, of the apparatus of FIGS. 2 and 3.
Figure 6:
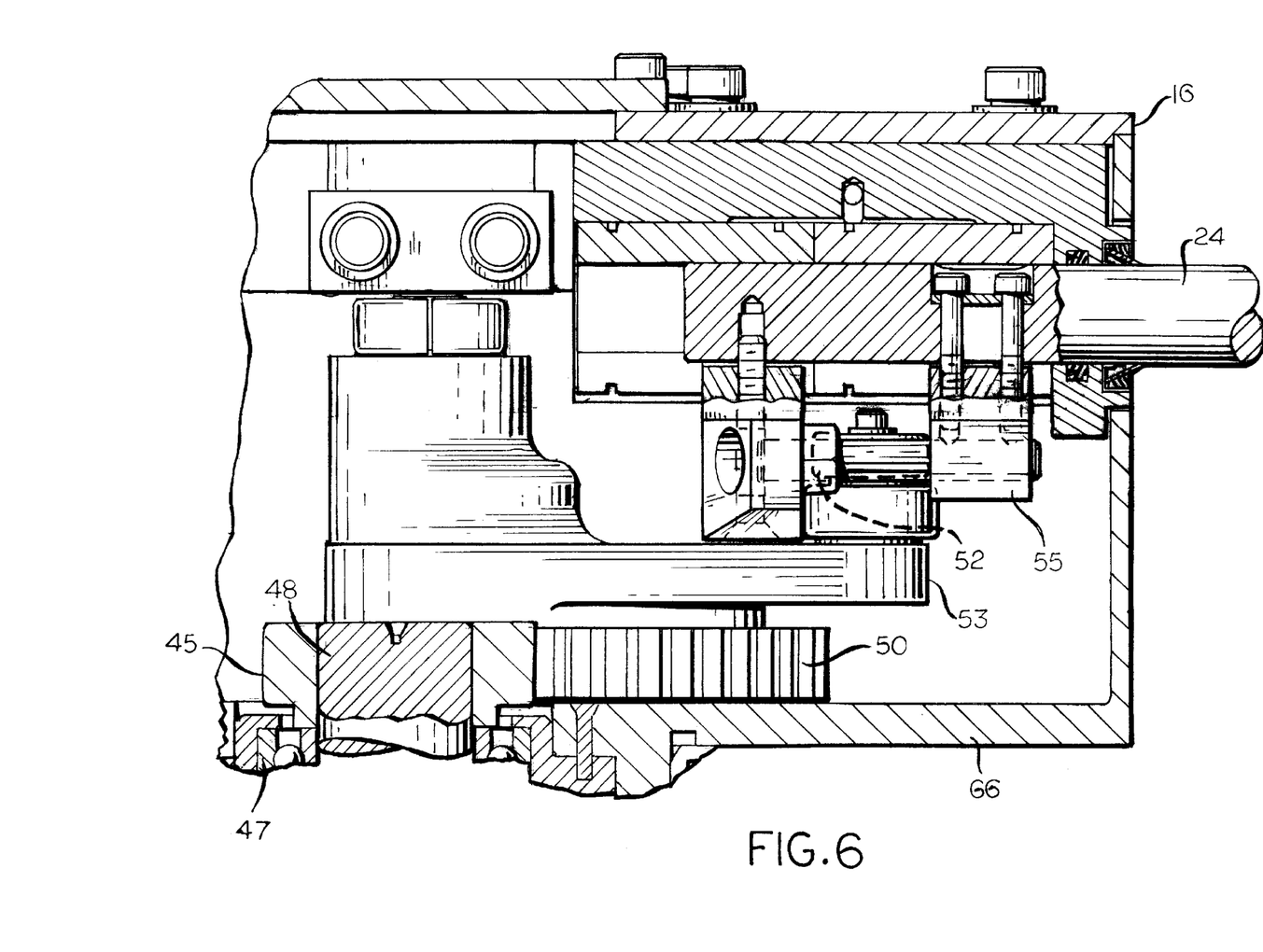
FIG. 6 is a sectional view taken on line 6—6 of FIG. 3.
Figure 7:
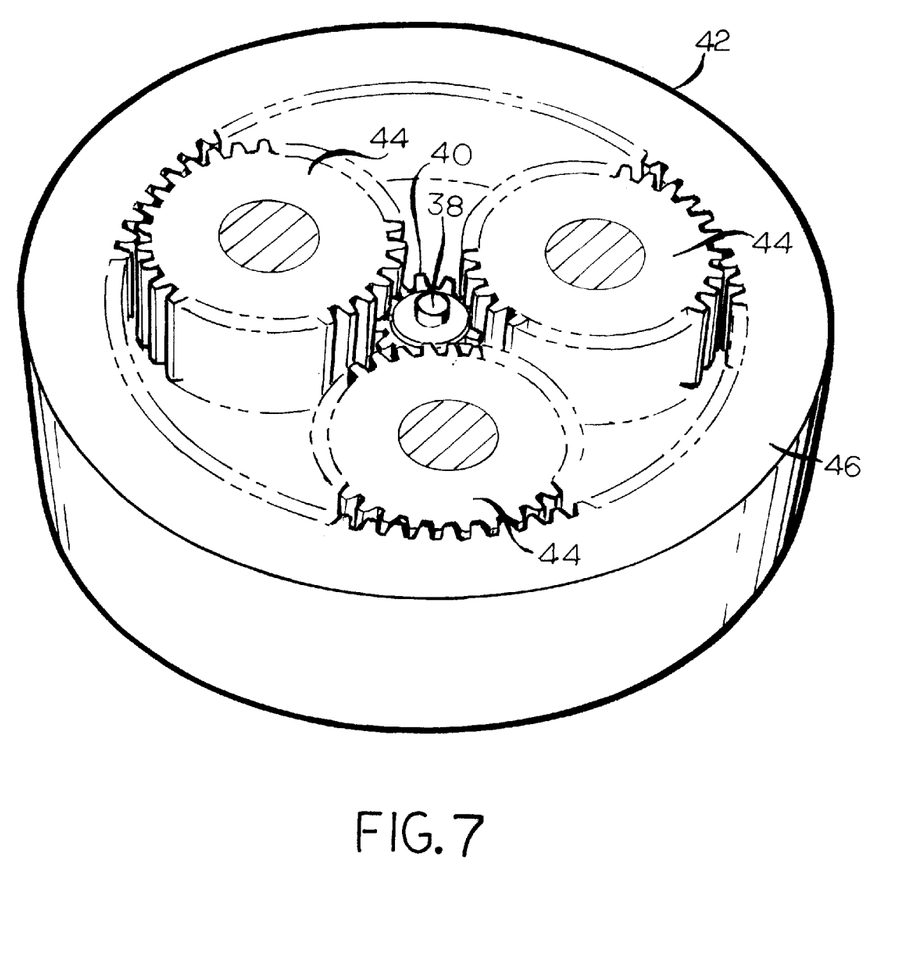
FIG. 7 is a fragmentary perspective view, partly in cross-section, of a portion of the apparatus of FIGS. 2–6.

The shaft extension 48 carries a drive gear 45, and the drive gear 45 drives a sector gear 50 (FIG. 6). The sector gear 50 is mounted for pivoting motion in and relative to the head 16 about a shaft 51 (FIG. 5) and has an overlying arm 53 (FIGS. 3, 5 and 6) that pivots with the sector gear 50, and arcuate motion of the shaft extension 48, which is caused to oscillate by reversing motion of the motor 28, causes reversible motion of a follower 52 that extends from the arm 53 and rides in a slot 54 in a bracket 55 to which the rods 24 are attached. Thus, the reversing motion of the motor 28 is effective to cause the rods 24, with the bar 20 and the fingers 22, to extend and retract in unison to move between the positions shown in FIGS. 1A and 1B, and to do so with virtually no backlash.

The a.c. motor 30 has an output shaft 56, and the shaft 56 is rotatably supported in spaced-apart bearings 58, 60. The output shaft 56 is annular in configuration and the output shaft 32 passes through the interior of the output shaft 56 so that the output shaft 56 and the output shaft 32 are rotatable independently of each other.

Figure 3:
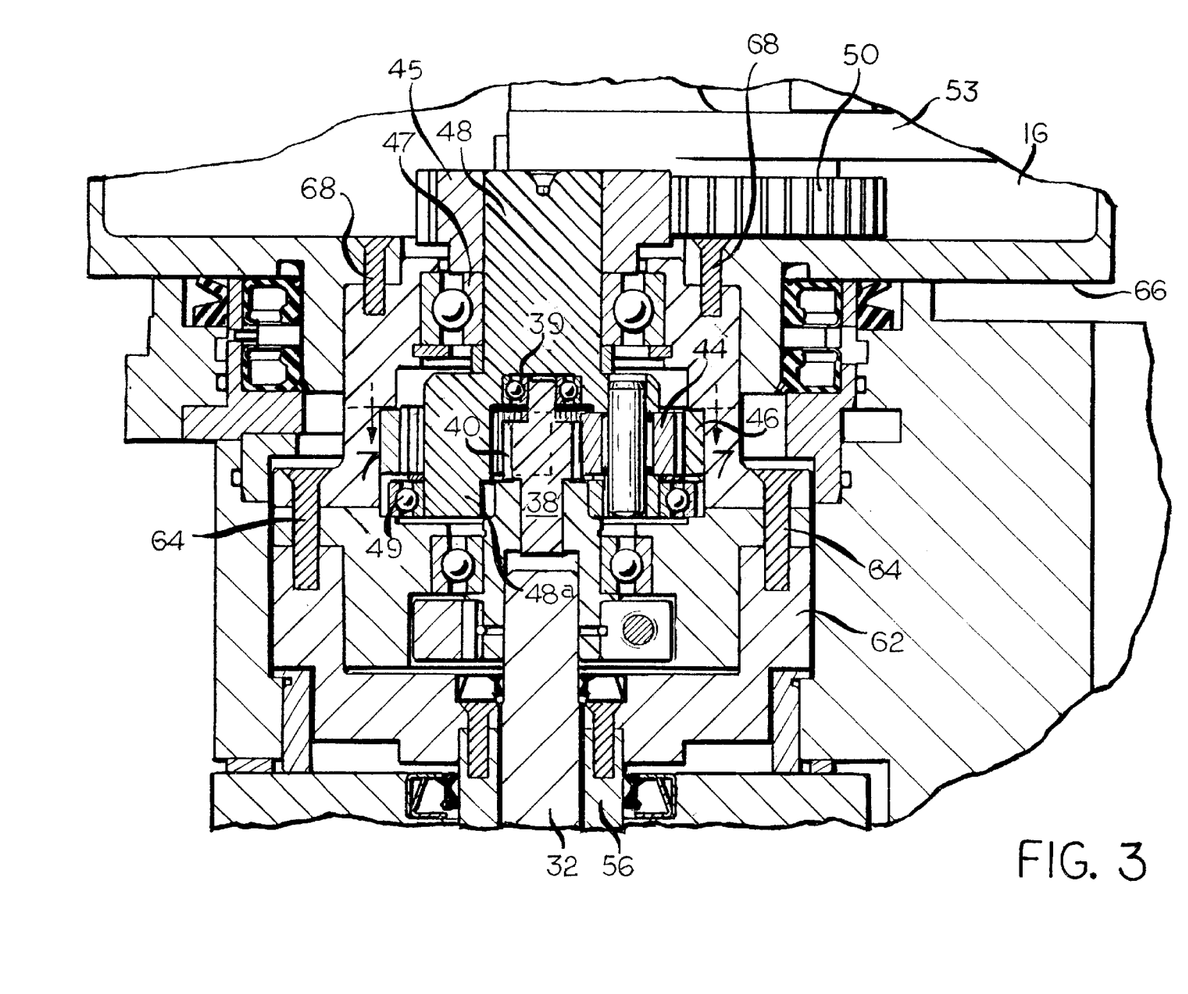
FIG. 3 is a fragmentary sectional view, at a further enlarged scale, of a portion of the apparatus of FIG. 2.
Figure 4:
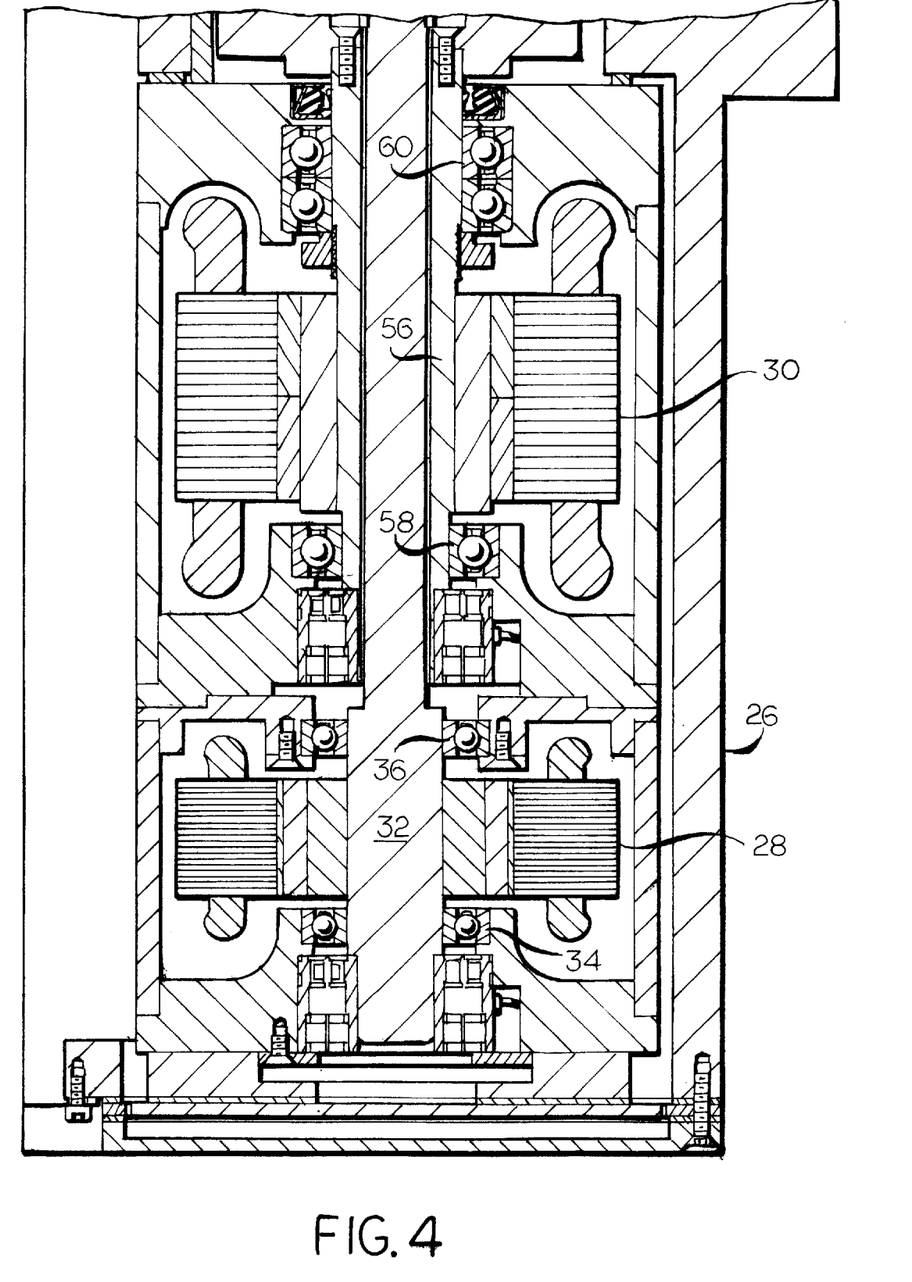
FIG. 4 is a view like FIG. 3 of an another portion of the apparatus of FIG. 2.

As seen best in FIG. 3, an annular housing 62 is secured to the shaft 56 by threaded fasteners 64, and an integral bottom plate 66 of the swivel portion 16 of the sweepout apparatus 10 is secured to the annular housing 62 by threaded fasteners 68. Thus, reversible arcuate motion is imparted to the shaft 56 by the motor 30, and this motion is effective to oscillate the swivel portion 16 of the sweepout apparatus 10 between the position shown in FIGS. 1A and 1B and the position shown in FIG. 1C, and this motion is must be controlled relative to the extension and retraction motions imparted to the sweepout head 18 by the motor 28, as both are performed together to impart such extension and retraction motions to the sweepout head while the swivel portion 16 is oscillating.

The sweepout apparatus 10, as heretofore described, uses motors 28, 30 within a housing 26 that need not be moved in service. Thus, wiring (not shown) to such motors may be stationary, thereby avoiding the need for flexible or extensible wiring to such motors in a relatively high temperature operating environment, and such wiring may be of a plug-in, quick disconnect type for rapid installation and removal of a sweepout apparatus 10 as a unit. Further, because the housing of the motors 28, 30 need not be moved in service, the motors 28, 30 may readily be oil cooled, as desired, because coolant inlet and outlet lines for such purposes need not be flexible. Further still, an electronic control unit, not shown, may, if desired, be mounted on the housing 26 and, if also desired, it too may be oil cooled, because inlet and outlet lines to and from it will require no flexible elements. In any case, positioning the motor 28, 30 below the head 16 will serve to somewhat reduce the temperatures to which the motor 28, 30 are exposed relative to that experienced by the head 16.

In the embodiment of FIGS. 8–11, elements that correspond at least in function to elements of the embodiment of FIGS. 1–7 are identified by a 100 series numeral, the last 2 digits of which are the same as the 2 digits of the embodiment of FIGS. 1–7.

Figure 8:
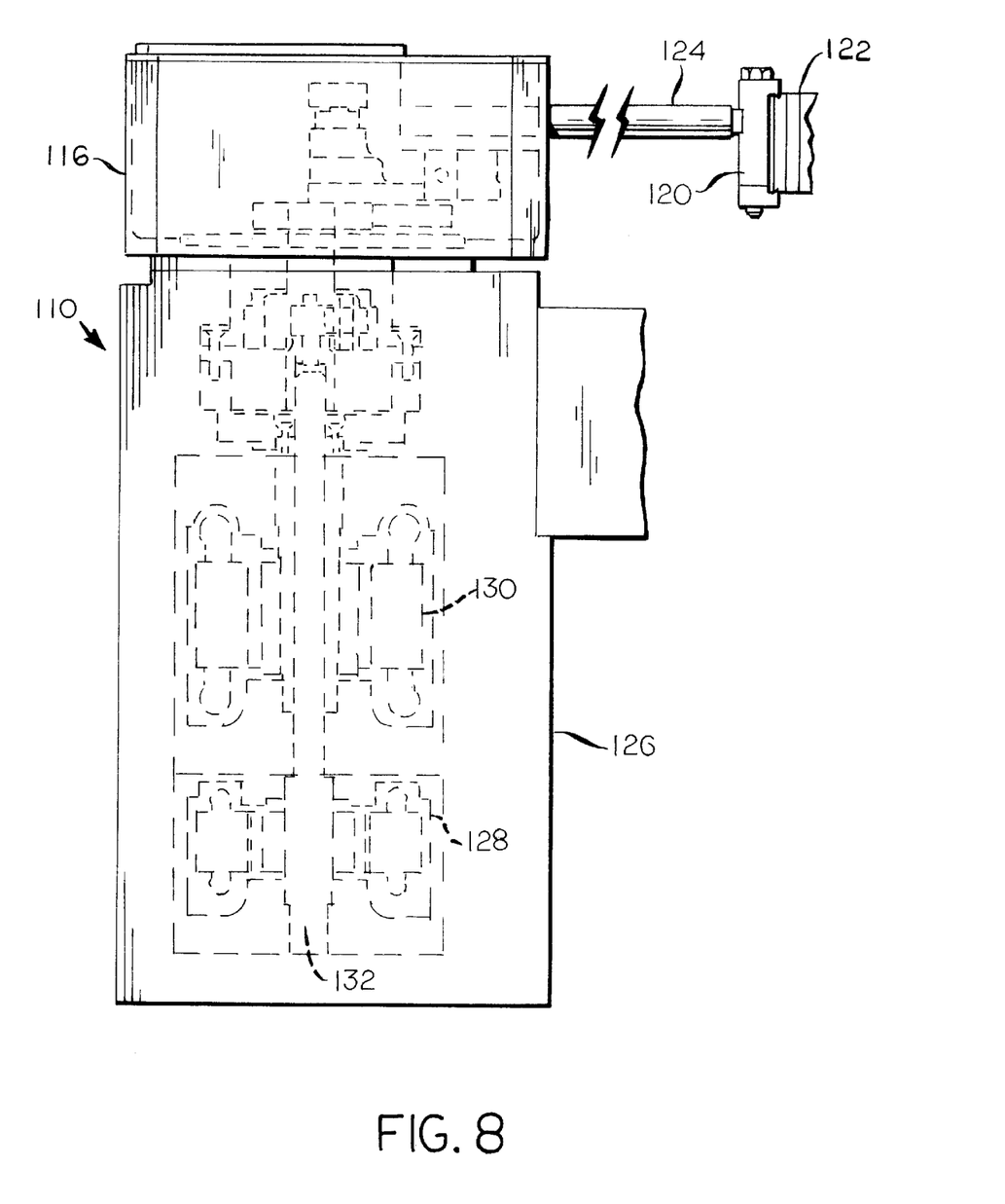
FIG. 8 is a view like FIG. 2 of an alternate embodiment of the present.

The sweepout apparatus according to the embodiment of FIGS. 8–11 is indicated generally by the reference numeral 110 in FIG. 8 of the drawing. The sweepout apparatus 110, like the sweepout apparatus 10, is used to simultaneously transfer an aligned plurality of freshly-formed glass containers on a deadplate of an I.S. machine to a moving upper flight of a takeout (machine) conveyor, which transfers the containers to an annealing lehr (not shown) for heat treatment of the containers to relieve residual stresses therein, as known in the art. The sweepout apparatus 110 is provided with a swivel portion 116 that is repeatedly oscillated through a 90° arc, and the swivel portion 116 is provided with a sweepout head 118 that is repeatedly reciprocated, in the matter of the path of reciprocation of the sweepout head 16 of the embodiment of FIGS. 1–7.

The sweepout head 118 includes an elongated, horizontally extending bar 120 with a plurality of spaced fingers 122 extending transversely from the bar 120. The elongated bar 120 is mounted on spaced horizontally extending rods 124 that are reciprocatable with respect to the swivel portion 116, as will be hereinafter described more fully, to reciprocate the bar 120 of the sweepout head 118.

The sweepout apparatus 110 includes a stationary housing 126 that is positioned below and in alignment with the swivel portion 116. First and second reversible a.c. motors 128, 130, each preferably a servo motor for precise controllability, are positioned in vertical, coaxial alignment with each other within the housing 126. The motor 128, which is positioned beneath the motor 130, drives an output shaft 132.

Figure 9:
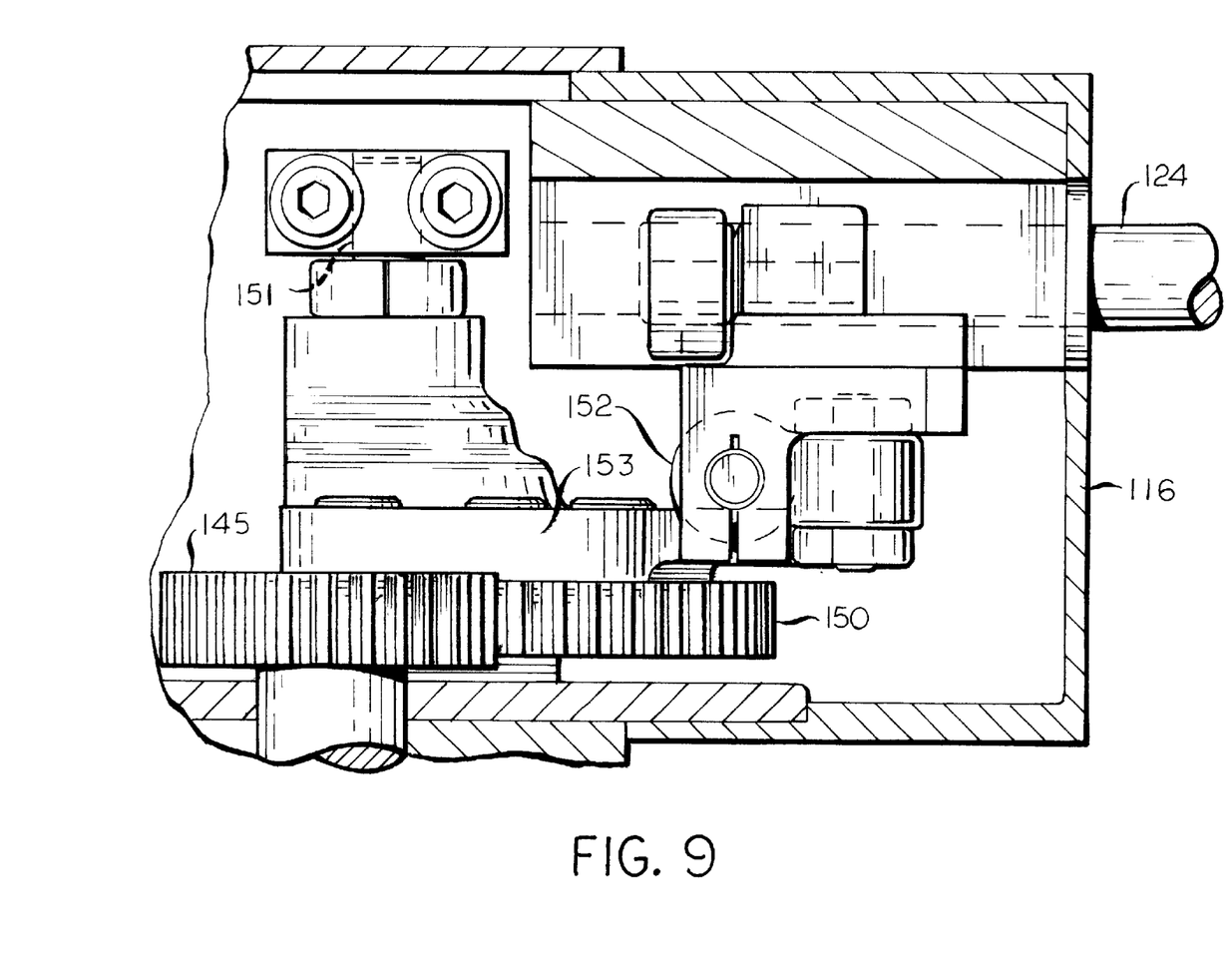
FIG. 9 is a view like FIG. 3 of a portion of the apparatus of FIG. 8.
Figure 10:
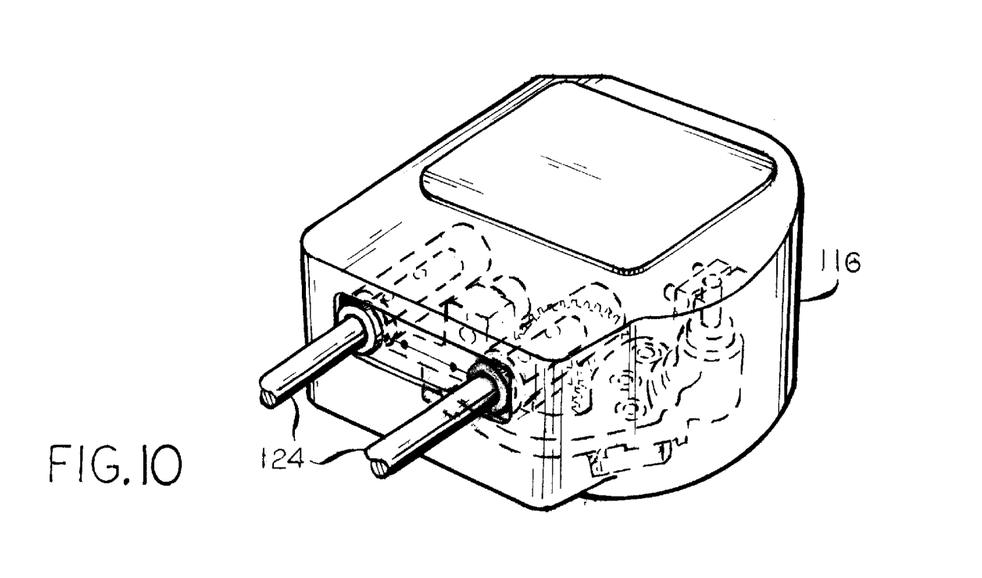
FIG. 10 is a fragmentary perspective view of a portion of the apparatus of FIG. 8.
Figure 11:
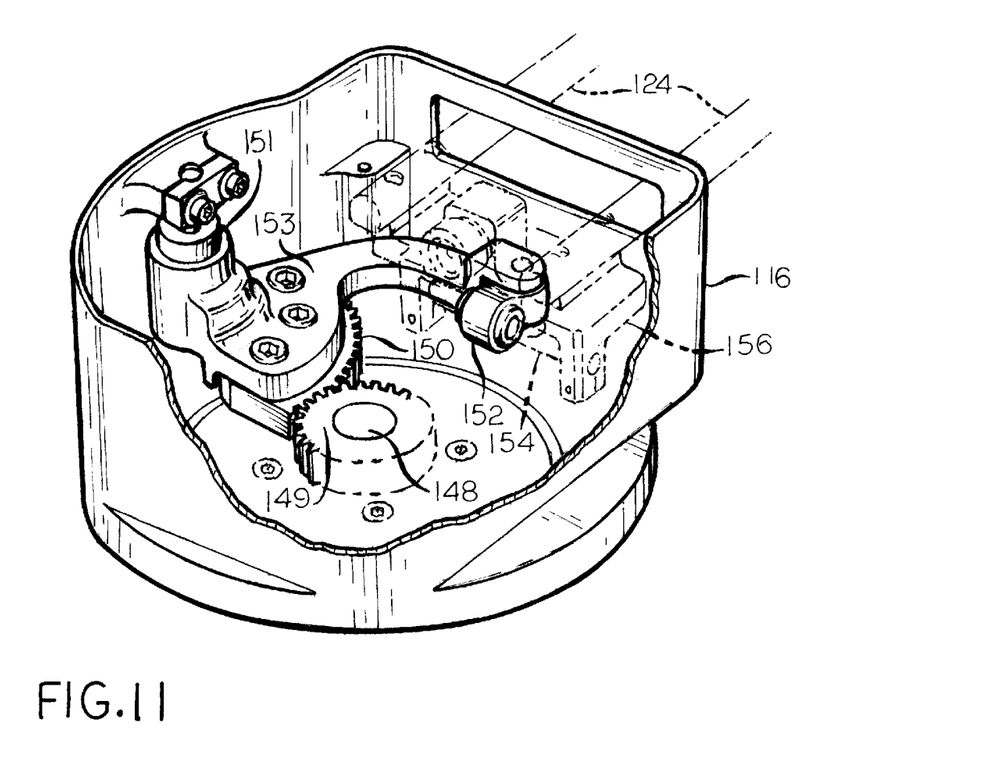
FIG. 11 is a view like FIG. 10 with the portion of the apparatus depicted therein being turned by 180° and with a portion of the apparatus being broken away.

The embodiment of FIGS. 8–11 differs from the embodiment of FIGS. 1–7 mainly in the construction illustrated in FIGS. 9–11, where a shaft extension 148 carries a drive gear 145, which drives a sector gear 150. The sector gear 150 is mounted for pivoting motion in and relative to the head 116 about a stub shaft 151 (FIG. 11) and has an overlying arm 153 that pivots with the sector gear 150. Arcuate motion of the shaft extension 148, which is caused to oscillate by reversing motion of the motor 128, causes reversible motion of a sleeve 152 that extends from the arm 153 and slidingly surrounds a rod 154 that is mounted in a bracket 156, to which the rods 124 are attached. Thus, the reversing motion of the motor 128 is effective to cause the rods 124, with the bar 120 and the fingers 122, to extend and retract in unison to move between the innermost and outermost positions of the bar 120, and to do so with virtually no backlash.

The sweepout apparatus 110, as heretofore described, uses motors 128, 130 within a housing 126 that need not be moved in service. Thus, wiring (not shown) to such motors may be stationary, thereby avoiding the need for flexible or extensible wiring to such motors in a relatively high temperature operating environment, and such wiring maybe of a plug-end, quick disconnect type for rapid installation and removal of a sweepout apparatus 110 as a unit. Further, because the housing of the motors 128, 130 need not be moved in service, the motors 128, 130 may readily be oil cooled, as desired, because coolant inlet and outlet lines for such purposes need not be flexible. Further still, an electronic control unit, not shown, may, if desired, be mounted on the housing 126 and, if also desired, it too may be oil cooled, because inlet and outlet lines to and from it will require no flexible elements. In any case, positioning the motors 128, 130 below the head 116 will serve somewhat to reduce the temperatures to which the motors 128, 130 are exposed relative to that experienced by the head 116.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited by the terms of the following claims and the legal equivalents thereof.

We claim:

1. Sweepout apparatus for transferring a plurality of aligned articles on a member to a conveyor that extends transversely to the aligned articles on the member, said apparatus comprising:

a head with an elongated bar having a spaced plurality of fingers extending transversely therefrom, each finger defining, with the elongated bar, a pocket for receiving one of the articles, said head with said elongated bar being oscillatable through an arc of 90° to sweep the plurality of articles from the member to positions on the conveyor, the elongated bar being reciprocable to engage the articles on the member and to retract from the articles on the conveyor;

a first reversible electric motor for imparting oscillating motion to the head, said first reversible electrical motor being fixed in position during its operation and having an annular output shaft operatively engaging said head;

a second reversible electric motor for imparting reciprocating motion to the elongated bar with respect to said head, said second reversible electric motor being fixed in position during its operation and being in coaxial alignment vertically below said first reversible electric motor, said second reversible electric motor having an output shaft extending through said annular output shaft of said first reversible electric motor, said annular output shaft of said first reversible electric motor and said output shaft of said second reversible electric motor being rotatable relative to one another; and a planetary gear transmission for imparting reciprocating motion from said output shaft of said second reversible electric motor to said elongated bar.

2. Sweepout apparatus according to claim 1 wherein each of said first reversible electric motor and said second reversible electric motor is an a.c. servomotor.

3. Sweepout apparatus according to claim 2 wherein:

each of said plurality of aligned articles is a freshly-formed glass container;

said member is a deadplate of I.S. glass container forming machine; and said conveyor is a machine conveyor in a glass container manufacturing plant.

4. Apparatus according to claim 3 wherein said planetary gear transmission comprises:

an annular sun gear operatively connected to said output shaft of said second reversible electric motor;

a circumferentially spaced-apart plurality of planetary gears engaging said sun gear; and an annular ring gear surrounding and operatively engaging each of said plurality of planetary gears.

5. Apparatus according to claim 4 wherein:

said plurality of planetary gears consists of three planetary gears.

6. Apparatus according to claim 5 and further comprising:

a sector gear;

structure for mounting said sector gear for oscillating motion about an axis spaced from an axis of said second reversible electric motor;

a drive gear driven by said planetary gear set and coaxially aligned with said second reversible electric motor, said drive gear engaging said sector gear;

at least one reciprocatable rod engaging said elongated bar;

a bracket to which said at least one elongated bar is attached, said bracket having a slot therein;

a link mounted coaxially with said sector gear for oscillation with said sector gear, said link having a free end spaced away from the axis of oscillation of said sector gear; and a roller follower at said free end of said link and received in said slot of said bracket, oscillation of said sector gear and said link causing said bracket to reciprocate by virtue of engagement of said roller follower in said slot.

7. Apparatus according to claim 6 wherein:

said at least one reciprocable rod comprises a spaced-apart plurality of reciprocable rods.

8. The method of transferring a plurality of aligned articles on a member to a conveyor that extends transversely to the aligned articles on the member, the method comprising:

providing an elongated bar having a spaced plurality of fingers extending transversely therefrom, each finger defining, with the elongated bar, a pocket for receiving one of the articles, the elongated bar being oscillatable through an arc of 90° to sweep the plurality of articles from the member to positions on the conveyor and being reciprocable to retract from the articles on the conveyor;

providing a first reversible electric motor to impart oscillating motion to the elongated bar;

providing a second reversible electric motor for imparting reciprocating motion to the elongated bar, said second reversible electric motor being positioned in coaxial alignment with said first reversible electric motor;

operating said first reversible electric motor to impart oscillating motion to the elongate bar; and operating said second reversible electric motor to impart reciprocating motion to said elongate bar.

9. The method according to claim 8 wherein:

each of the plurality of aligned articles on the member is a freshly-formed glass container;

the member is a deadplate of an I.S. glass container forming machine; and the conveyor is a machine convenyor in a glass container manufacturing plant.

\* \* \* \* \*